O. K. BAKKEN.
AUTOMOBILE TRANSMISSION GEARING.
APPLICATION FILED MAR. 11, 1919.
1,335,811.
Patented Apr. 6, 1920.
2 SHEETS—SHEET 1.
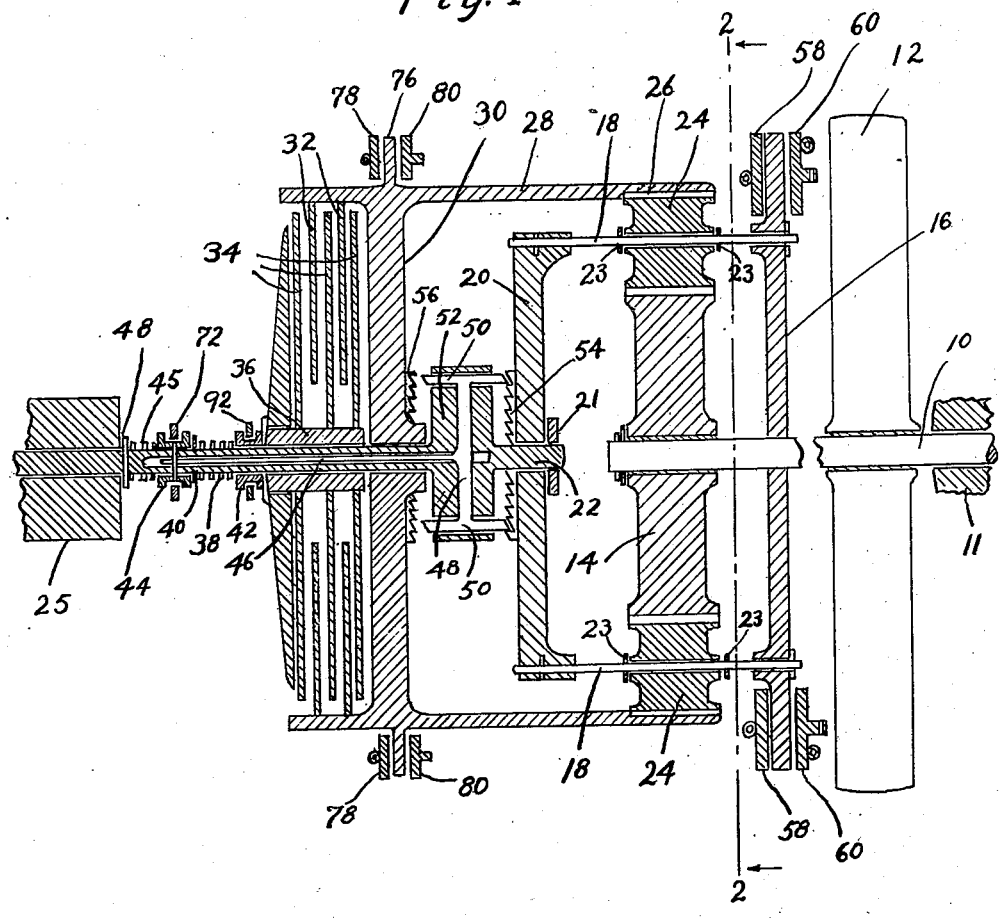
Inventor
Ole K. Bakken
By Whiteley and Ruckman
his Attorneys.

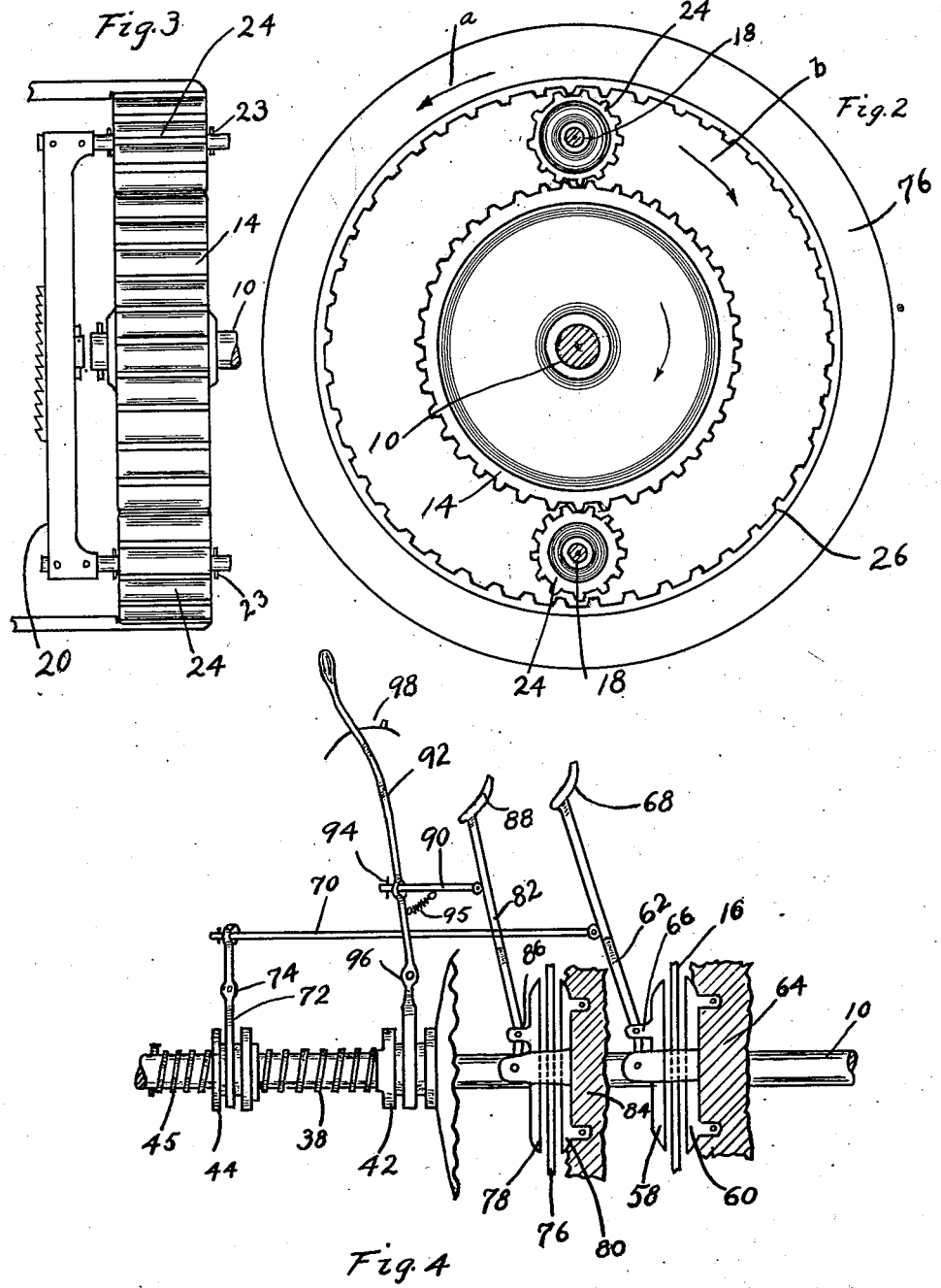

UNITED STATES PATENT OFFICE.

OLE K. BAKKEN, OF NORTHWOOD, NORTH DAKOTA.

AUTOMOBILE TRANSMISSION-GEARING.

1,335,811.     Specification of Letters Patent.     Patented Apr. 6, 1920.

Application filed March 11, 1919. Serial No. 281,956.

*To all whom it may concern:*

Be it known that I, OLE K. BAKKEN, a citizen of the United States, residing at Northwood, in the county of Grand Forks and State of North Dakota, have invented certain new and useful Improvements in Automobile Transmission-Gearing, of which the following is a specification.

My invention relates to automobile transmission gearing and while intended for use in connection with automobiles particularly, it can, obviously, be used in connection with trucks and tractors. An object is to provide mechanism of this kind by the employment of which the vehicle can be started in either forward direction or backward direction with an easy movement and the car can be driven in a forward direction at different speeds.

Another object is to provide mechanism of this character which can be readily set by the operator to accomplish any of the desired ways of operating vehicles.

The full objects and advantages of my invention will appear in connection with the detailed description, and the novel features embodied in my inventive idea will be particularly pointed out in the claims.

Referring to the accompanying drawings, which illustrate the application of my invention in one form,—

Figure 1 is a view in longitudinal section through my transmission mechanism. Fig. 2 is a view in cross-section on the line 2—2 of Fig. 1. Fig. 3 is a side elevational view of the gears. Fig. 4 is a view illustrating the operating connections in a partly diagrammatic manner.

Referring to the particular construction shown in the drawings, 10 designates the driving shaft of an internal combustion engine, said shaft being mounted in a bearing 11 on the frame and having the fly wheel 12 secured thereon. Upon the rear end of the shaft 10 a spur gear 14 is keyed, and loosely mounted on the shaft between this gear and the fly wheel is a disk 16 in which are fastened the ends of a pair of rods 18, the other ends of which are secured in a disk 20 which is loosely mounted on the forward end of a shaft 22 adjacent a collar 21 secured thereto. The rear end of the shaft 22 is mounted in a bearing 25. Upon each of the rods 18 between fixed collars 23 is rotatably mounted a planetary gear 24, these two gears being in mesh with the spur gear 14 and also being in mesh with an internal gear 26 located within one end of a casing member consisting of a cylindrical portion 28 and a disk portion 30 loosely mounted on the shaft 22. The cylindrical portion 28 is extended beyond the disk portion 30 and carries the alternate members 32 of a multiple disk clutch the other members 34 of which are secured to a sleeve 36 splined on the shaft 22. The disks are normally held in engaged or clutched position by a spring 38 surrounding the shaft 22 between a collar 40 fixed thereto and a grooved collar 42 slidably mounted on the shaft and adapted to engage the sleeve 36. A second grooved collar 44 is slidably mounted on the shaft 22 and a spring 45 surrounding the shaft between this collar and a collar 48 fixed to the shaft normally holds the collar 44 in engagement with the fixed collar 40. A portion of the shaft 22 has a central bore, and within this bore is adapted to slide a rod 46 which is pinned to the sliding collar 44. To the forward end of the rod 46 is secured a crossbar 48 having on each of its outer ends a bar pawl 50, the opposite ends of which are inclined so as to act in opposite directions. The crossbar and the pawls slide in a recess in an enlarged portion 52 of the shaft 22. This recess may be formed in any suitable manner, and, if desired for convenience in manufacture, the enlarged portion 52 may be made in two parts divided transversely and bolted together, one of the parts being carried by the forward portion of the shaft 22 and the other part being carried by the rear portion of this shaft. The pawls when held by spring 45 in forward position as shown in Fig. 1 are adapted to be engaged by an annular ratchet 54 carried on the rear face of the disk 20. The collar 44 is adapted to be moved rearwardly against the tension of the spring 45 in a manner presently to be described, and when this is done the pawls 50 are drawn rearwardly so as to engage an annular ratchet 56 carried on the forward face of the disk 30 and having teeth oppositely inclined from those of the ratchet 54. The disk 16 is adapted to be acted upon by a brake consisting preferably of two partly annular brake shoes 58 which may be caused to engage the rear face of the disk near its margin so that this portion of the disk is pinched between the brake shoes and fixed members 60, which may be shaped similarly to the shoes 58 and are secured to the frame. In order to operate the brake shoes 58 a lever 62 has its lower forked ends pivoted on brackets 64, and these forked ends are connected with the brake shoes by means of lugs 66. The lever 62 is provided at its top with a foot pedal 68 and is connected by a rod 70 with the upper end of a lever 72 pivoted at 74 to the frame and having its lower forked end engaging in the groove of the collar 44. In order to cause reverse movement of the vehicle the foot pedal 68 is pushed forward to apply the brakes to the disk 16, this movement also pulling the rod 70, and through the connections with the pawls 50 the latter are moved from engagement with the ratchet 54 into engagement with the ratchet 56. The brakes 58 will at first allow the disk 16 to slip and the reverse movement of the vehicle is thus started slowly. When the brakes are fully set the planetary gears 24 will have a movement around their axes only, the gear 26 and the cylindrical member 28 then attaining maximum speed in the direction of the arrow $a$ in Fig. 2.

In order to drive the vehicle ahead at different speeds and to start slowly without jerking movement, the following mechanism is provided. The cylindrical member 28 is provided with an annular member 76 with which are adapted to coöperate the partly annular brake shoes 78 and the fixed members 80 secured to the frame and operating similar to the members 58 and 60, respectively, the brake shoes 78 being moved by a lever 82 pivoted at its lower forked end to the brackets 84. The shoes are connected to the lever by lugs 86, and a foot pedal 88 is mounted on the top of the lever 82. A rod 90 is attached at its forward end to the lever 82 and the rear portion of this rod extends loosely through an opening in a hand lever 92 and is provided with an enlarged end 94. A spring 95 connects the rod 90 and the lever 92 and normally holds the brake shoes 78 out of contact with the annular member 76. The hand lever is pivoted at 96 to the frame and the lower forked end engages in the groove of the collar 42. It is to be noted that when the engine is first started that the engine will be running idly, since the gear 14 imparts a movement of rotation on their axes only to the planetary gears 24, the latter thus turning the gear 26 in the direction of the arrow $a$. In order to move ahead the operator pushes the foot pedal 88 to apply the brakes 78 and hold the gear 26 stationary. At the same time the rod 90 pulls the lever 92 and moves the sleeve 42 rearwardly so that the clutch disks are disengaged. The planetary gears then travel slowly around the central gear 14 in the direction of the arrow $b$, and through the disk 20 and pawls 50 a slow motion is imparted to the shaft 22, this motion being started gradually since the brakes allow the ring 76 to slip at first. Upon taking off the brakes 78 the clutch disks will engage and the central gear 14, the planetary gears 24 and the cylindrical member 28 will travel around together, thus imparting a high speed to the shaft 22. A catch 98 is provided so that the operator can move the hand lever 92 forwardly and fasten it in forward position at any time that he desires, thus changing to slow speed on account of the clutch disks being disengaged. Upon releasing the catch 98 from the lever the change from low speed to high speed will be made.

I claim:

1. An automobile transmission gearing comprising a driving shaft, a driven shaft, means for causing said driving shaft to rotate said driven shaft in a direction to drive the vehicle forwardly at slow speed, a brake associated with said means, a lever connected to said brake for applying the same when the vehicle is to be started, a clutch normally held clutched to said driven shaft for rotating the same to drive the vehicle forwardly at high speed, and connections between said lever and said clutch to unclutch the latter when the vehicle is started.

2. An automobile transmission gearing comprising a driving shaft, a driven shaft, means for causing said driving shaft to rotate said driven shaft in reverse direction to move the vehicle backwardly, a brake associated with said means, a lever connected to said brake for applying the same when the vehicle is to be backed, pawl and ratchet mechanism normally engaged to cause the driven shaft to rotate in a direction to drive the vehicle forwardly, and connections between said lever and said mechanism to cause the latter to become operative to rotate the driven shaft in reverse direction.

3. An automobile transmission gearing comprising a driving shaft, a spur gear secured to the end of said shaft, a driven shaft in alinement with said driving shaft and having its end adjacent the end thereof, a disk loosely mounted on the end of said driven shaft, a disk loosely mounted on said driving shaft beyond said spur gear, rods connecting said disks, planetary gears mounted on said rods, a cylindrical member having a disk portion rotatably mounted on said driven shaft, an internal gear carried by said cylindrical member, said planetary gears meshing with said internal gear and with said spur gear, annular ratchets on the flat faces respectively of said disk portion and the disk which is on the driven shaft, pawl mechanism slidably carried by said driven shaft, and means for causing said pawl mechanism to engage either of said annular ratchets at will.

4. An automobile transmission gearing comprising a driving shaft, a spur gear secured to the end of said shaft, a driven shaft in alinement with said driving shaft and having its end adjacent the end thereof, a disk loosely mounted on the end of said driven shaft, a disk loosely mounted on said driving shaft beyond said spur gear, rods connecting said disks, planetary gears mounted on said rods, a cylindrical member having a disk portion rotatably mounted on said driven shaft, an internal gear carried by said cylindrical member, said planetary gears meshing with said internal gear and with said spur gear, annular ratchets on the flat faces respectively of said disk portion and the disk which is on the driven shaft, a rod slidably mounted in said driven shaft, pawls carried by said rod, means for operating said rod to cause said pawls to engage one or the other of said annular ratchets, a sleeve splined on said driven shaft, coöperating clutch members carried by said sleeve and by said cylindrical member, and means for sliding said sleeve to cause said clutch members to engage or disengage.

In testimony whereof I hereunto affix my signature.

OLE K. BAKKEN.